(12) United States Patent
Marianne (10) Patent No.: US 11,488,155 B2
(45) Date of Patent: Nov. 1, 2022

(54) PROXY CHECKOUT AND PAYMENT TRANSACTION SERVICES

(71) Applicant: PayPal, Inc., San Jose, CA (US)

(72) Inventor: Noam Marianne, Petach-Tikva (IL)

(73) Assignee: PAYPAL, INC., San Jose, CA (US)

( * ) Notice: Subject to any disclaimer, the term of this patent is extended or adjusted under 35 U.S.C. 154(b) by 295 days.

(21) Appl. No.: 16/731,950

(22) Filed: Dec. 31, 2019

(65) Prior Publication Data

US 2021/0201300 A1 Jul. 1, 2021

(51) Int. Cl.
*G06Q 20/38* (2012.01)
*G06Q 30/06* (2012.01)
*G06Q 20/08* (2012.01)
*G06Q 20/32* (2012.01)
*G06Q 20/40* (2012.01)

(52) U.S. Cl.
CPC ....... *G06Q 20/383* (2013.01); *G06Q 20/0855* (2013.01); *G06Q 20/326* (2020.05); *G06Q 20/4093* (2013.01); *G06Q 30/0641* (2013.01)

(58) Field of Classification Search
None
See application file for complete search history.

(56) References Cited

U.S. PATENT DOCUMENTS

| 8,255,291 | B1 | 8/2012 | Nair | |
|---|---|---|---|---|
| 9,972,013 | B2 | 5/2018 | Howe | |
| 2004/0015566 | A1* | 1/2004 | Anderson | G06Q 20/00 709/219 |
| 2004/0148254 | A1 | 7/2004 | Hauser | |
| 2013/0211953 | A1 | 8/2013 | Abraham et al. | |
| 2013/0339122 | A1* | 12/2013 | Truitt | G06Q 30/0269 705/14.26 |
| 2014/0033317 | A1* | 1/2014 | Barber | G06Q 30/0609 726/26 |
| 2015/0120508 | A1* | 4/2015 | Black | G06Q 30/0635 705/26.81 |

(Continued)

OTHER PUBLICATIONS

"How You Can Buy Multiple Tickets With A Proxy Network", Smartproxy, Dec. 17, 2019, online <https://smartproxy.com/blog/tickets-proxy>.

(Continued)

*Primary Examiner* — Neha Patel
*Assistant Examiner* — Nicholas K Phan
(74) *Attorney, Agent, or Firm* — Haynes and Boone, LLP (57) ABSTRACT

A method for using proxy checkout services is discussed. The method includes accessing transaction details of a potential transaction for an item or a first service at a merchant, the potential transaction initiated by a user at a user device at a first location. The method includes responsive to a determination, based on merchant characteristics or user characteristics, that use of proxy services is permitted, initiating proxy services for performing the potential transaction at different user locations. The method includes determining, based on selection criteria, a particular proxy service from the proxy services for initiating a proxy transaction based on the potential transaction using one of different user locations. The method includes causing a user interface of the user device to render a user-selectable option for performing the proxy transaction instead of the potential transaction.

20 Claims, 6 Drawing Sheets

(56) References Cited

U.S. PATENT DOCUMENTS

2017/0124625 A1 5/2017 Williams et al.
2018/0285951 A1* 10/2018 Borovikov ......... G06Q 20/4016

OTHER PUBLICATIONS

Paraskevas, Alexandros and Kontoyiannis, Kryiakos, "Travel Comparison Websites: An Old Friend with New Clothes", Department of Hospitality, Tourism and Leisure Management, Business School, Oxford University, United Kingdom; Information and Communication Technologies in Tourism 2005, pp. 486-496.
"Android Pay: proxy no more", Random Oracle: Building and breaking systems; online <https://randomoracle.wordpress.com/2015/09/29/android-pay-proxy-no-more/>.

* cited by examiner

PROXY CHECKOUT AND PAYMENT TRANSACTION SERVICES

BACKGROUND

Embodiments of the present disclosure generally relate to the field of software payment systems and, more particularly, to using proxy services for certain checkout and payment transactions.

Software payment systems can facilitate various financial transactions for customers and merchants alike. A payment system can be used for processing transactions between customers and merchants, such as by facilitating shopping experiences, payments, and/or order fulfilments. A payment system can, for example, facilitate shopping experience by offering checkout functionality from a merchant provided website and/or application. A payment system can allow the user to access his or her payment account and/or financial instrument during the checkout functionality. However, current options available to the customers do not provide some options and/or flexibility for easy and convenient checkout functionality. Since some customers are unable to finalize their checkout transactions, some merchants can lose sales thus resulting in shopping cart abandonments, lost sales and revenues, and potentially lost customers.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and/or computer program products that embody techniques of the present disclosure. However, it is understood that the described embodiments may be practiced without these specific details. For example, although many examples refer to providing proxy checkout services, other transactions are contemplated, such as providing proxy fund transfer and/or payment transactions, among others.

In general, software payment systems can facilitate various financial transactions between customers and merchants. A payment system can be integrated by a merchant to provide seamless checkout experience for customers accessing that merchant's shopping functionality. The merchant can use various functionality provided by a payment system to provide near-frictionless shopping experiences to its customers, including providing easily accessible shopping cart, checkout, and/or payment functionality. Typically, a decrease in friction to the customer can prevent lost sales from disinterested shoppers and/or shopping cart abandonments, and potentially can also prevent lost customers. One way to decrease friction is to provide better integrated checkout and/or payment solutions, some of which can be achieved by implementing proxy transaction services.

In some embodiments, a payment system can access transaction details of a potential transaction for an item or a first service at a merchant associated with a first merchant location, the potential transaction initiated by a user at a user device at a first user location. The payment system can determine, based on one or more of merchant characteristics of the merchant or one or more user characteristics associated with the user, whether the potential transaction is associated with a proxy permission that allows use of proxy services. The payment system can, in response to determination that the potential transaction is associated with the proxy permission, initiate one or more proxy services for the potential transaction using one or more user locations of the user, wherein each of the one or more user locations is different from the first user location. The payment system can select a particular proxy service from the one or more proxy services for initiating a proxy transaction based on the potential transaction using a different user location, said selecting based on comparing one or more selection criteria with results from the one or more proxy services.

In some embodiments, a payment system can determine transaction details of a potential transaction initiated by a user for an item or a first service at a merchant associated with a first merchant location, the potential transaction accessed from a user device at a first user location. The payment system can, responsive to a determination that a potential transaction is associated with the proxy permission indicating permission to use proxy services, initiate one or more proxy services for performing the potential transaction at one or more user locations of the user, each of the one or more user locations being different from the first user location. The payment system can determine, based on one or more selection criteria, a particular proxy service from the one or more proxy services for initiating a proxy transaction based on the potential transaction using a user location that is different from the first user location. The payment system can cause a user interface of the user device to render a user-selectable option for performing the proxy transaction instead of the potential transaction. The following description and associated Figures illustrate various embodiments directed to the ideas listed above.

Figure 1:
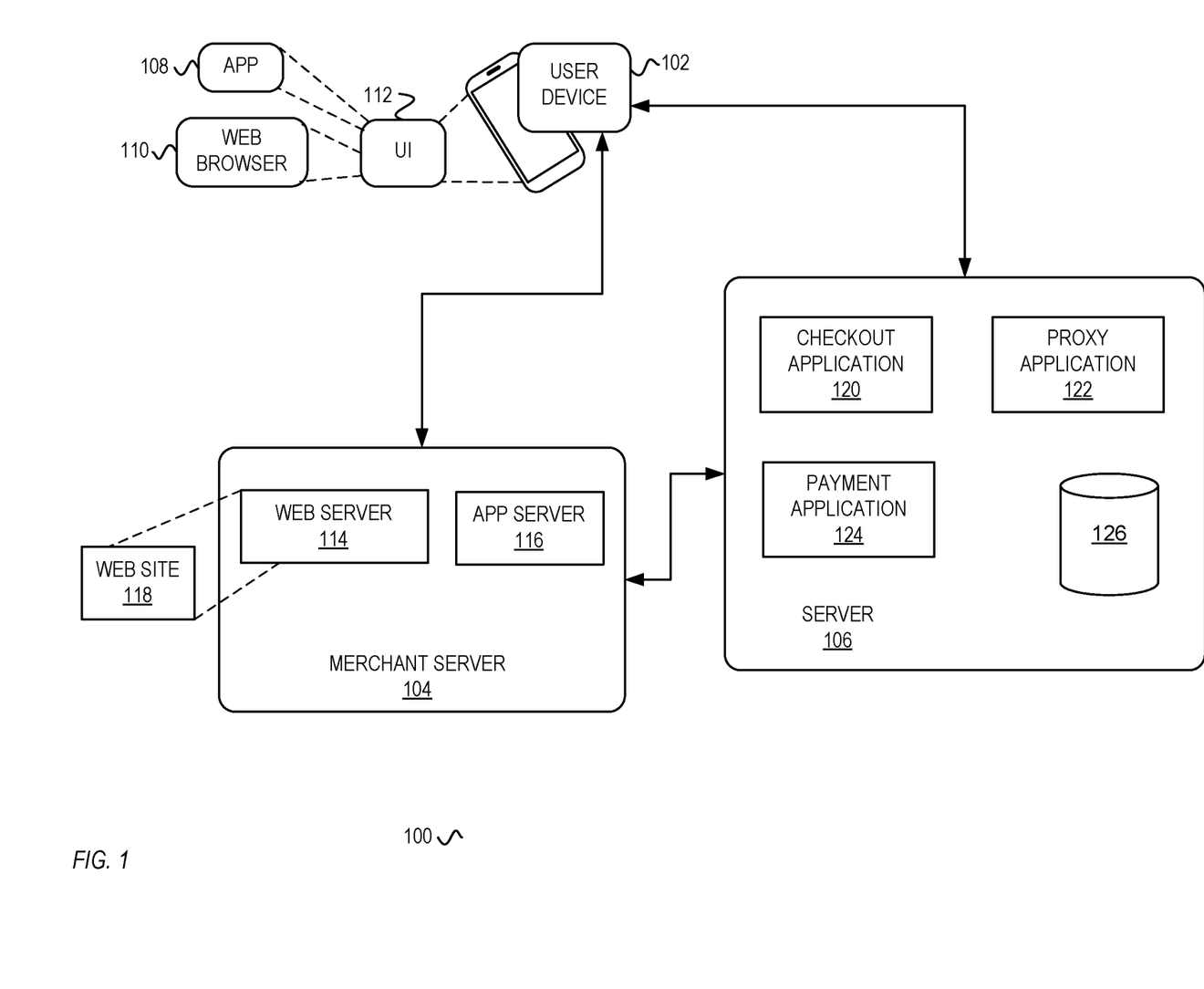
FIG. 1 is a system diagram illustrating embodiments of a payment system that implements proxy transaction services and is coupled with a user device and a merchant server.

FIG. 1 is a system diagram illustrating embodiments of a payment system that implements proxy transaction services and is coupled with a user device and a merchant server. A user of a user device 102 can access the merchant server 104 to access shopping functionality provided by a merchant, such as to purchase items and/or services. The merchant server 104 can provide experience flows of online shopping to customers that access the merchant server 104 via their user devices. The merchant server 104 can communicate with a server 106 of a payment system to access various merchant related functions including shopping cart, checkout, and/or payment, elements of which can be also provided to the user devices during the shopping experience flows. In addition to providing merchant functionality, the server 106 can implement various functions of the payment system, including providing (directly or indirectly via merchant-provided user experiences) proxy transaction services to the user device 102.

The user device 102 can be any type of a computing device that can access the online shopping functionality (and/or other functions) provided by the merchant server 104. The user device 102 can be implemented using an electronic device, such as discussed below with reference to FIG. 6. The user can access the shopping functionality via a User Interface (UI) 112 that is displayed by the user device 102, such as by an application 108 or a web browser 110. The user can interact, via the UI 112, with displayed user experiences (that can be provided by the merchant server 104). The UI 112 can display a shopping cart that indicates user selections of items (or services) for purchase from the merchant. The UI 112 can display one or more checkout options for the selected items or services. The UI 112 can display one or more payment options for any selected items or services, e.g., that were checked out during a user requested transaction. User selection of one of the checkout options which can initiate a certain transaction(s) at the merchant server 104 and/or at the server 106.

The merchant server 104 can include a web server 114 and/or an application server 116 (referred to collectively as a user experience server). The web server 114 can provide user experience(s) to the web browser 110 via a web site 118. The app server 116 can provide similar user experience to the app 108. The user experience server can facilitate user access (via the UI 112) to the online shopping flow, such as selection of items and/or services provided by the merchant. The user experience server can provide various checkout options for selection by the user via the UI 112. The merchant server 104 can also communicate with the server 106 to access various payment system functionality provided by the server 106, including a checkout application 120, one or more proxy applications 122, and/or a payment application 124. The merchant server 104 can provide results of accessing the server 104 to the user device 102. The merchant server 104 can embed some of the accessed functionality via the user experience server, e.g., such that some of the accessed functionality is caused to be displayed and/or accessible to the user via the UI 112.

In some cases, the merchant server 104 can process a purchase request from a user differently depending on a geographical location of the user, referred to as user locations. Some merchants can offer different prices for the same item and/or service depending on location of the user. Some of these price differences can be attributed to compliance and/or regulatory requirements, including taxes, tariffs, and/or import/export duties, among others. Some of these price differences can be attributed to different storage or shipping costs if the bought item needs to be shipped to the customer. Some of these price differences can be attributed to various government subsidies, federal and/or local. Some of these price differences can be attributed to marketing/pricing strategies, such as a merchant can determine to charge customers of a certain region more than customers from another region. Some items/services can also go on sale or promotion in certain regions, but not in other regions. Some of the price differences can be attributed to exchange rates, as a user located in Italy can have a disadvantageous exchange rate compared to one obtained by the proxy services and/or market rate. In some cases, the merchant server 104 can itself be accessible at different locations, referred to as merchant locations. In some instances, the same user (i.e., from the same user location) can obtain a different price by accessing different locations of the same merchant.

The server 106 can provide payment system functionality to the user device 102 and/or to the merchant server 104. The payment system can be for processing transactions, such as payments from the user, order fulfilments for user-selected items, and/or services at the merchant. The payment system can perform risk analysis on the transactions to determine whether or not to perform the transactions (e.g., whether to process a payment for the selected item and/or service). The payment system can include payment accounts, each of which can be associated with a buyer (e.g., the user) or a seller (e.g., the merchant). The payment system can process payments from the user account that is associated with the user of the user device 102. The payment system can provide financial services, such as a fund transfer (e.g., a transfer of a certain monetary amount), to the user of the user device 102. For example, a buyer (e.g., the user of the user device 102) can be associated with one payment account, and the seller (e.g., the merchant) can be associated with another payment account at the payment system. Upon successfully performing the risk analysis on the requested purchase transaction, the payment system can then perform a fund transfer from the buyer's payment account to the seller's payment account. The payment system can be implemented by PAYPAL or another online payment system that allows users to send, accept, and request fund transfers.

The server 106 can include the checkout application 120, the proxy application 122, the payment application 124, and a database 126. As discussed herein, the server 106 can provide proxy transaction services that can find items/services offered by the same merchant at different merchant locations and/or accessed by different user locations in order to obtain the best deal for the customer. The server 106 can offer the merchant substantially the same integrated merchant services such as risk analysis of the customer, payment processing, and shopping cart integration. In some implementations, the merchant can opt-in or opt-out of the proxy transaction services. In some implementations, the server 106 can only offer the proxy transaction services to a certain tier of customers, such as premium customers of the merchants and/or premium users of the payment system. In some implementations, the server 106 can implement the proxy transaction services only upon determining that any regulatory and/or compliance regulations are properly met. In some implementations, the server 106 can determine which user locations out of all possible user locations available to a certain merchant can be used, i.e., to eliminate any possible user locations such as certain countries or other geographical areas that are ineligible to receive the item/service from the merchant. The server 106 can perform the same merchant location eligibility determination based on merchant locations. The server 106 can also determine that some items are ineligible for various user locations, such as for a user located on a different continent due to shipping logistics, whereas the same user location is eligible to receive a service, such as an airline ticket.

The server 106 can access transaction details of potential transactions (for items/services) at the merchant by monitoring user interactions with the shopping experience (e.g., as provided by the user experience server). The server 106 can, for example, determine that the user has selected an item/service to a shopping basket, saved such an item/service, and/or appears interested in a certain item/service. The server 106 can determine the location of the user, such as by determining location of the user device 102 by geolocation techniques, internet protocol (IP) address of the user device, and/or a login information associated with the user, among other techniques. The server 106 can determine a location of the merchant accessed by the user, as the merchant can offer its services at various locations around the same country and/or the world. The server 106 can determine the user and/or merchant locations based on information received from the merchant server 104. In some implementations, the server 106 and/or a third-party server (not shown) can provide merchant-side functionality for the merchant, including provision of shopping experiences to the user device, shopping cart management, and/or inventory management, among others. The server 106 can obtain the user and/or merchant locations based on information received from the third-party server.

The server 106 can access merchant characteristics of the merchant and/or user characteristics (e.g., as stored by the database 126) of the user to determine whether use of proxy transaction services is permitted for that combination of the user and merchant locations. The server 106 can provide proxy transaction services, via the proxy application 122, to users for transactions where use of the proxy transaction services is permitted. The proxy application 122 can initiate one more proxy services for permitted transactions. Each of the proxy services can be configured to mimic user characteristics of the initial user interaction (e.g., from the potential transaction), while varying one or more characteristics of the user, such as user location, when accessing the same merchant. In some implementations, the proxy services can also vary one or more characteristics of the merchant, such as by accessing different locations of the same merchant. When accessing the same merchant, each proxy service can mimic a different user location, such as by anonymizing the user, such as by using VPN, proxy servers, and/or other techniques. Since the same server 106 is handling the potential transaction from the user, the server 106 can offer the same protection (e.g., risk management) to the merchant even though the actual location of the user is disguised.

The server 106 can identify, based on results from the proxy application 122, a proxy service that offers the best price (or another best parameter) to the user. The server 106 can then communicate with the merchant server 104 to provide a user selectable option to use the identified proxy session. Depending on the implementation and/or integration of the server 106 with the merchant server 104, the provision of the identified proxy session can vary. In cases where the server 106 is providing merchant services to the merchant, such as by redirecting a user checkout experience flow to the server 106, the server 106 can simply provide an option to use the identified proxy session in addition to an option to use the initial user location (and/or other user parameter that is being varied) of the potential transaction.

In cases where the experience server is providing merchant services embedded into the merchant provided experience functionality (such as by the website 118 or by the data/configuration provided by the app server 116), the server 106 can change functionality to be provided to the user device 102. For example, where the server 106 is providing a checkout button that is embedded in the website 118, the server 106 can add a second button or add an option to the previously rendered checkout button to indicate the identified proxy service. In cases where the server 106 is providing functionality for the app server 116 for provision to the app 108, the server 106 can add an option to the functionality to indicate the identified proxy service. In some cases where the server 106 does not provide a checkout button for the merchant server 104, the server 106 can provide an indication to the user (via the UI 112) to initiate a new session that uses the same user characteristics (e.g., a different user location) as of the identified proxy session. Some embodiments of how the identified proxy is provided to the user device is discussed below with reference to FIG. 4.

The proxy transaction service techniques discussed herein allow the user to obtain a better rate for the same item/service that is provided from the same merchant. The merchant can keep the customer and not lose the sale, while still obtaining various merchant services. For example, a customer can obtain a cheaper flight from New York to San Francisco for a US-based airline merchant when using a proxy service disguising the customer as a US-based as opposed to a foreign (i.e., non-US based) customer. In some embodiments, the proxy transaction services can provide a proxy checkout service for each item in the customer's shopping cart as soon as it is added to the cart, without waiting for the customer to initiate a checkout process. In some embodiments, the proxy transaction services can operate in real-time, that is the proxy services can be ran continuously for the items in the shopping cart, which can result in the best proxy to be updated/changed in the same customer shopping sessions. In some embodiments, the proxy transaction services can be performed on items that are determined to be interesting to the customer, before the customer selects them to the shopping cart.

Figure 2:
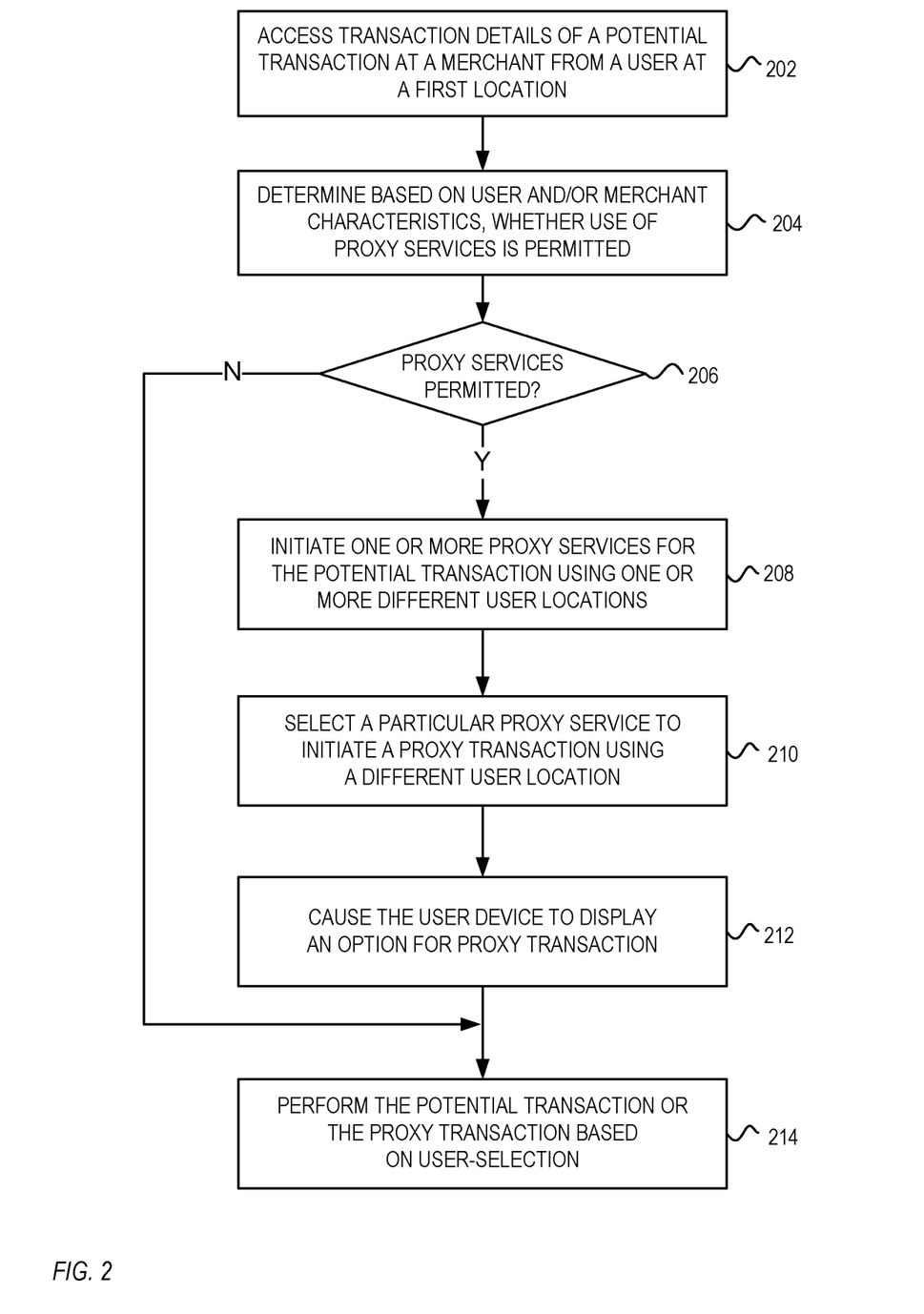
FIG. 2 is a flow chart illustrating embodiments of operations for using the proxy transaction services.

FIG. 2 is a flow chart illustrating embodiments of operations for using the proxy transaction services. The method of FIG. 2 is described with reference to the systems and components described in FIG. 1 (for illustration purposes and not as a limitation). The example operations can be carried out by the server 106, including the checkout application 120, the proxy application 122, and/or the payment application 124 of the server 106.

Beginning with 202, the server 106 can access transaction details of a potential transaction for an item or a service. The potential transaction can be associated with a first merchant location of a merchant. The potential transaction can be associated with, and initiated by such as via the UI 112, the user of the user device 102. The user can be associated with a first geographical location. In some embodiments, the server 106 can determine that the merchant server 104 receives, from the user device 102, a transaction request for the potential transaction. The transaction details can be based on the transaction request. In some embodiments, the server 106 can determine the transaction details for the potential transaction prior to receiving an associated transaction request, such as based on user interaction within the shopping experience flow.

At 204, the server 106 can determine, based on user and/or merchant characteristics, whether use of proxy services is permitted for the potential transaction. In some embodiments, the server 106 can determine whether use of proxy services is permitted for the potential transaction based on certain regulatory and/or compliance requirements. In certain use cases, the server 106 can determine to provide proxy services to the user without approval and/or knowledge of the merchant, such as by modifying a checkout button provided to the merchant server 104 that can allow the user device to communicate with the server 106 directly. At 206, the server 106 can direct a flow of operations based on the determination of 204. If the server 106 determines that the use of proxy services is permitted, flow continues to 208, otherwise the flow continues to 214.

The user characteristics can indicate whether the user is a trusted user of the merchant and/or the payment system. The user characteristics can indicate his or her risk level with relation to transactions at the merchant. The user characteristics can indicate whether the user has accumulated a certain amount of loyalty points, e.g., by using services of the merchant and/or the payment service. The user characteristics can indicate an actual location of the user (e.g., the geographical location from which the potential transaction is initiated). The user characteristics can indicate that a certain flag/permission to use proxy sessions is previously set by the user. The merchant characteristics can indicate whether the merchant has a single accessible location, or multiple locations (such as in different cities, states, countries). The merchant characteristics can indicate whether the merchant allows use of proxy sessions. Some merchants can opt in or opt out for use of all proxy sessions. Some merchants can allow use of proxy sessions by the server 106 only for certain customers, such ones that have at least a certain number of loyalty points.

At 208, the server 106 can initiate one or more proxy services for the potential transaction using one or more user locations. In some embodiments, the server 106 can initiate one or more proxy services for the potential transaction using one or more merchant locations, and/or combinations of different user and merchant locations. The proxy application 122 can initiate a proxy transaction in a proxy transaction session that uses the transaction details of an original session originated by the user (e.g., of the original shopping experience flow accessed by the use via the UI 112). The proxy transaction can be configured to use payment instrument of the user configured for the original session. The initiation of the proxy services can include accessing a merchant server 104 using a different set of user characteristics at each of the one or more proxy services, where each of the one or more proxy services can be configured to appear unique to the merchant server 104. In effect, each of the proxy services as initiated by the proxy application 122 can appear as a unique user that is using a unique user device. In some cases, the potential transaction can include multiple items that include the item/service. The proxy application can use a different set of proxy services for each of these items/services.

As discussed with reference to FIG. 5, each of the one or more proxy services (initiated by the proxy application 122) can include a respective agent of one or more agents, wherein each of the one or more agents replicates at least some of the transaction details. Each one of the agents can vary at least one of the transaction details. Each of the one or more proxy services can be configured to anonymize the user at each of the one or more user locations and/or the one or more merchant locations.

At 210, the server 106 can select a particular proxy service to initiate a proxy transaction using a different user location, where the selection can be based on selection criteria as applied to results from the proxy services of 208. The selection criteria can include selection criteria comprise one or more of price of the item, shipping speed for delivery of the item to the user, cost of the delivery, any exchange rate differences, and/or taxes associated with the potential transaction and each of respective proxy transactions associated with the proxy services, among others. Regarding exchange rate differences, different locations of the user may have different base currencies, and the price of the item can be in some cases subject to the value of one country's currency in relation to another currency base on the current market exchange rate.

At 212, the server 106 can cause the user device 102 to display an option for the selected proxy transaction. Depending on the implementation, the option can be displayed as a modification to an existing checkout button, or rendering a new button layout, that is provided to the merchant server for provision to the UI 112 (e.g., via the experience server). The option can be displayed as an option during a shopping experience flow that is managed by the server 106.

At 214, the server 106 can perform the potential transaction, or the proxy transaction based on a user selection. The user selection can be received via the UI 112. Depending on the implementation, the user selection can be received via button(s) managed by the server 106. If the flow is from 206, the server 106 can perform the potential transaction. If the flow is from 212, the server 106 can perform either the potential transaction or the proxy transaction.

Figure 3A:
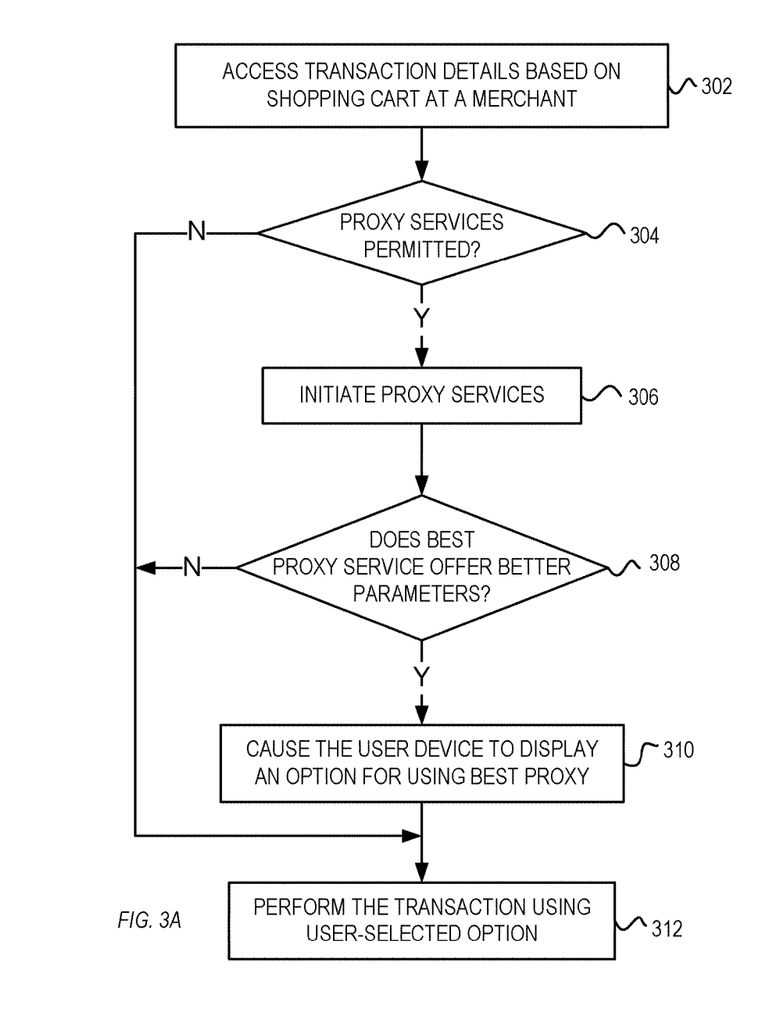
FIGS. 3A and 3B are flow charts illustrating embodiments of detailed operations of using the proxy transaction services.
Figure 3B:
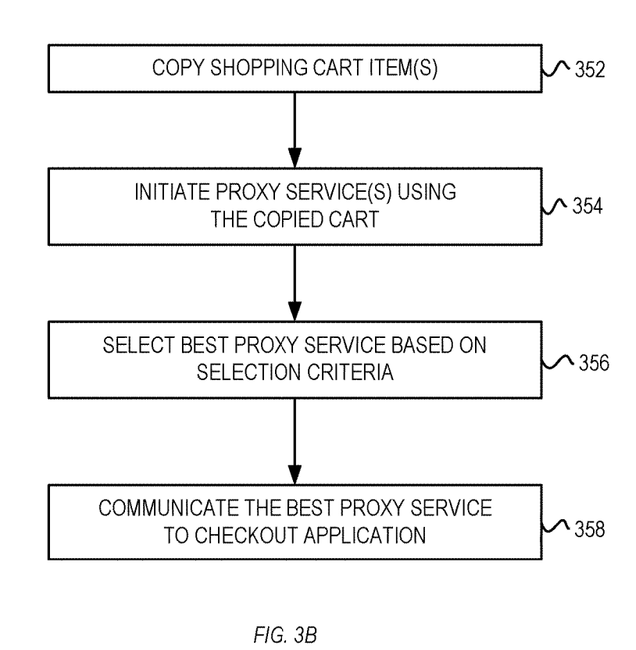

FIGS. 3A and 3B are flow charts illustrating embodiments of detailed operations of using the proxy transaction services. FIG. 3A illustrates operations of the checkout application 120, according to some embodiments. FIG. 3B illustrates operations of the proxy application 122, according to some embodiments. Various approaches discussed above apply to the embodiments of FIGS. 3A and/or 3B.

At 302 of FIG. 3A, the checkout application 120 can access transaction details based on a shopping cart of the merchant. The checkout application 120 can provide shopping cart functionality (e.g., as part of a shopping experience flow) to the merchant (e.g., to the merchant server 104). At 304, the checkout application 120 can determine whether proxy services are permitted. If the checkout application 120 determines that the use of proxy services is permitted, flow continues to 306, otherwise the flow continues to 312. At 306, the checkout application 120 can initiate proxy services, such as discussed with reference to FIG. 3B.

At 308, the checkout application 120 can determine, based on results from results from the proxy services, whether one of the proxy services (e.g., a best proxy service) offers better parameters (e.g., price and/or other selection criteria) than what is obtainable by the user's initial potential transaction. If the checkout application 120 determines that the best proxy service offers better parameters, 310, otherwise the flow continues to 312. At 310, the checkout application 120 can cause the UI 112 to display the option for using the best proxy service. At 312, the checkout application 120 perform the checkout transaction using the user-selected option. The payment application 124 can then finalize a payment for the checkout transaction, regardless of the option that was selected by the user.

At 352 of FIG. 3B, the proxy application 122 can copy shopping cart item(s)/service(s) (as well as any additional details associated with the user) from the shopping cart, e.g., of the potential transaction. At 354, the proxy application 122 can initiate proxy services using the copied shopping cart items (and any additional details, as appropriate). At 356, the proxy application 122 can select the best proxy service based on selection criteria. At 358, the proxy application 122 can communicate the best proxy service to the checkout application 120.

Figure 4:
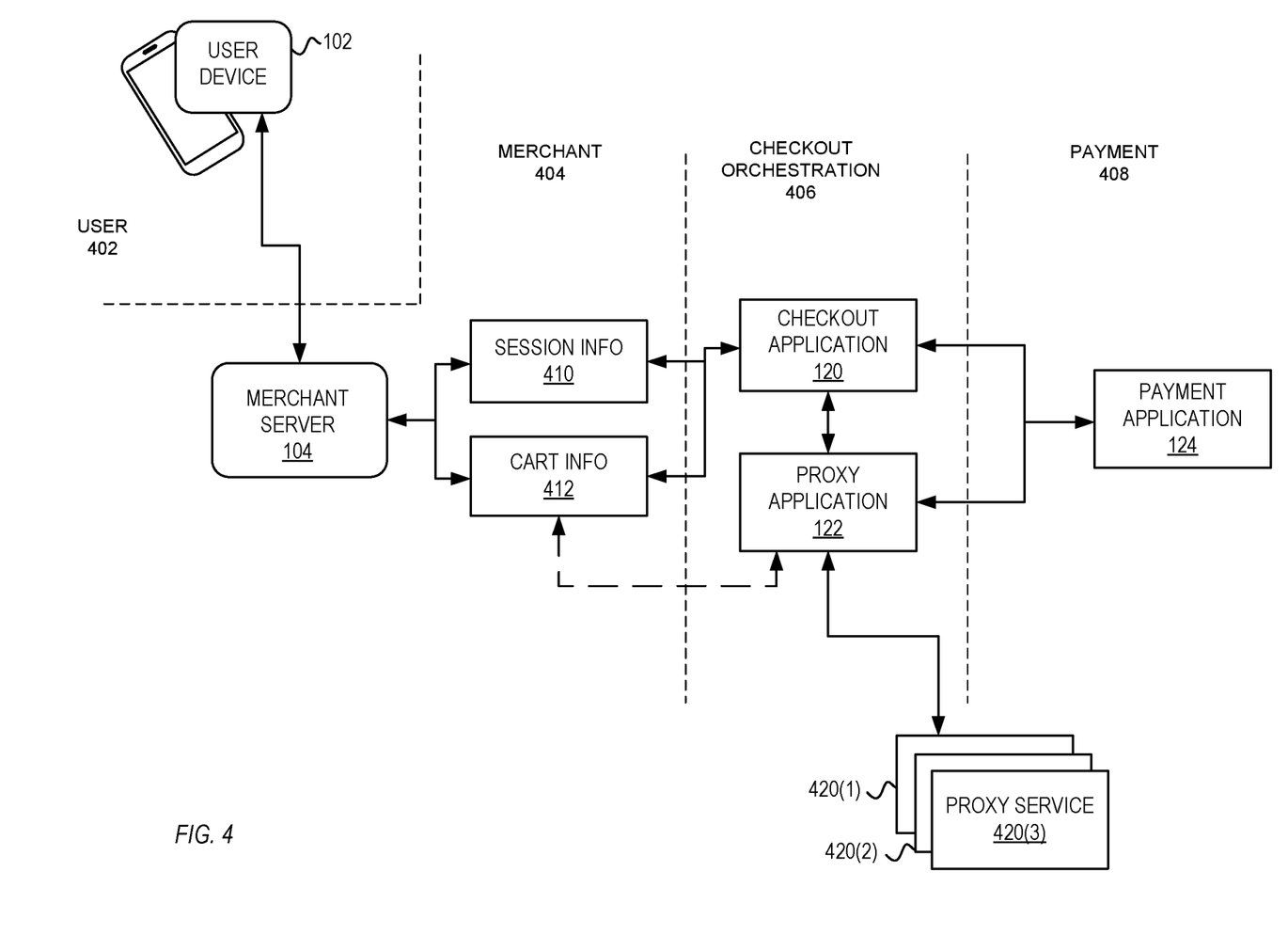
FIG. 4 is a communication chart illustrating flow of operations performed by various components of a payment system that implements the proxy transaction services.

FIG. 4 is a communication chart illustrating flow of operations performed by various components of a payment system that implements the proxy transaction services. FIG. 4 illustrates embodiments of operation where the server 106 offers merchant services to the merchant server, such as via a checkout button that is integrated via experience server, such as into the website 118. As discussed below, the proxy transaction can take the flow from the merchant, e.g. from the website 118, to the checkout application 120 and proxy application 122, back to the website 118. FIG. 4 illustrates a user portion 402, a merchant portion 404, a checkout orchestration portion 406, and a payment portion 408.

If the proxy services are permitted, the checkout application 120 can obtain transaction details from the merchant portion 404, such as directly from the merchant and/or from a server 106 or third-party functionality providing merchant services. The transaction details can include session info 410 and shopping cart info 412. The transaction details can be obtained from the website 118. The checkout application 120 can provide the transaction details to the proxy application 122. The proxy application 122 can initialize and manage execution of multiple proxy services 420(1)-420(3) (referred to collectively as proxy services 420).

Each of the proxy services 420 can create a separate proxy session, each of which can run in a separate private/incognito mode, such as to mimic a different geo location. Each of the proxy services 420 can recreate a replica of the shopping experience (and most of the customer parameters) initially provided by the user, while changing at least one parameter, such as user location, at the same merchant. The proxy services 420 can then return results, to the proxy application 122, of their respective shopping experiences, which can include obtaining the final price on the item/service, but without finalizing that transaction. The proxy application 122 can then identify the best proxy service, and provide that back to the checkout application 120, which can cause the UI 112 to render the additional proxy checkout option for user consideration. If the user selects the best proxy service, the proxy application 122 can then finalize the transaction, and use the payment application 124 to finalize the checkout. If the user selects the initial transaction (e.g., the potential transaction), the checkout application 120 can then finalize the transaction, and also use the payment application 124 to finalize the checkout. Thus, the proxy application 122 integrates the proxy transaction services with the existing merchant services architecture.

In some embodiments, the server 106 can offer data management functionality for the proxy. The checkout application 120 can manage a shared session cache that guides the customer through the checkout experience at the merchant 404. The data management elements can include user account numbers, EC token (Express Checkout token), and/or order ID at the merchant. These transaction details can be provided to the proxy application 122. However, each proxy service 420 can manage its own separate session cache, i.e., separate from the shared session cache of the initial transaction.

In some embodiments, the proxy application 122 can expose the following functionality to other elements of the server 106, such as to the checkout application 120.

ProxyMaster—this is the first call made by the checkout service to establish a master proxy agent. The master proxy agent (e.g., as managed by the proxy application) can store in cache the parent checkout token ID. The master proxy agent can manage all sub-proxy API calls.

ProxyAgent—this n be made by the proxy master service to establish proxy agent. The proxy agent (e.g., the proxy service) can store in cache the parent checkout token ID, CreateProxyAgentSession—this call can create a session id for the proxy agent id. The session can retrieve and store the following information: user data, merchant preferences, business entities, authorization info, and/or shopping cart info.

GetProxyMerehantInfo—this call can return cart and/or transaction information from merchant site per specific account. Invocation for this call can be performed after the user has logged into the payment system account (e.g., at the server 106) and clicked the checkout button (on the website 118). This call can obtain specific information about the transaction, e.g., as linked to a checkout token.

GetProxyRate—this call can be made for each proxy agent to retrieve cart item rates for that proxy service. As discussed above, the proxy session can perform a replica of the same shopping experience on the merchant site, since the proxy agent can use customer data from the parent original session.

GetProxyCheekoutMinimalRate a this call can be made by master proxy agent to retrieve the minimal cart item rates collected from all proxies.

DoProxyCheckout API—this can be the final call made from the merchant page once the master proxy agent confirms the transaction via proxy agent session.

Figure 5:
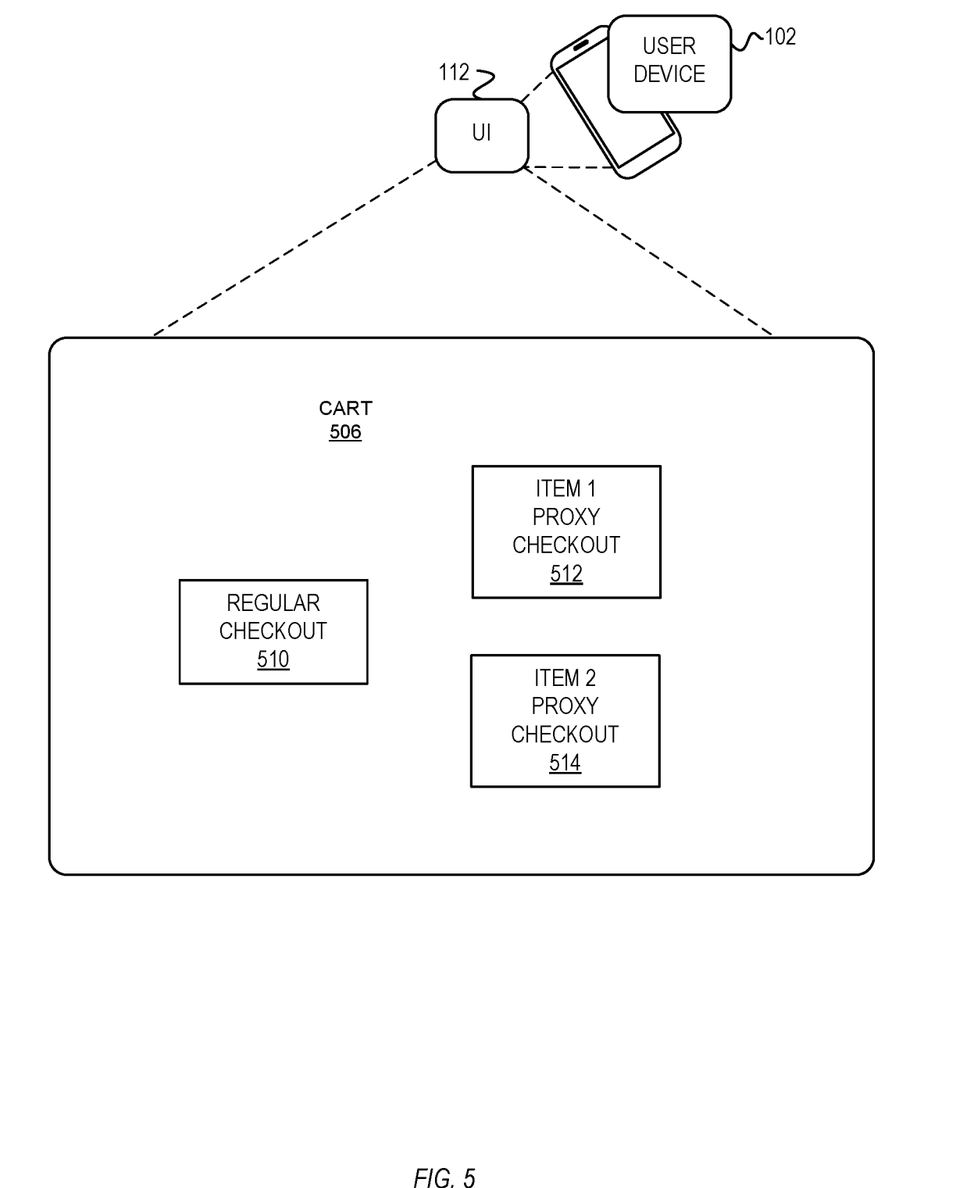
FIG. 5 is a system diagram illustrating embodiments of user interface displayed on a user device that accesses the payment system that implement the proxy transaction services.

FIG. 5 is a system diagram illustrating embodiments of user interface displayed on a user device that accesses the payment system that implement the proxy transaction services. The UI 112 can display a cart 506 with items/services selected for purchase from a certain merchant. In this example, there are two items in the shopping cart. The merchant server can use a checkout button 510 that uses a regular checkout based on the initial user and merchant locations. The checkout button 510 can be a single button for all of the items in the customer's shopping cart. Item 1 proxy checkout button 512 and item 2 proxy checkout button 514 can be provided to the merchant experience server for rendering on the UI 112 based on performance of the proxy transaction services described herein. Upon selection of one of the checkout buttons 510, or 512 and/or 514, the server 516 can finalize the checkout transaction and perform the payment function for that merchant and user.

It should be understood that FIGS. 1-5 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the flow diagrams of FIG. 2-4 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer programs products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 6:
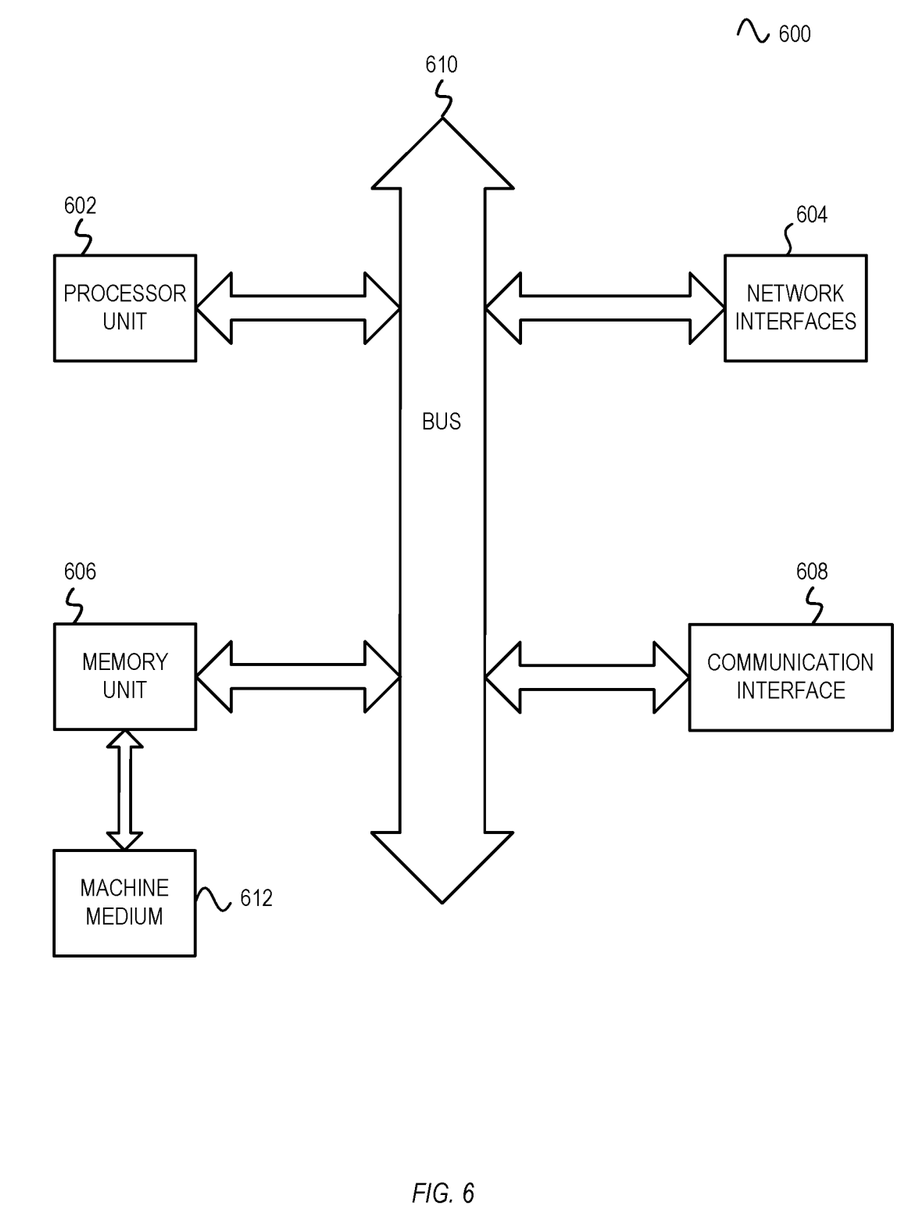
FIG. 6 is a block diagram illustrating embodiments of electronic devices used by and/or with the payment system implementing the proxy transaction services of FIGS. 1-5.

FIG. 6 is a block diagram of one embodiment of an electronic device 600 used in the communication systems of FIGS. 1-5. In some implementations, the electronic device 600 may be a laptop computer, a tablet computer, a mobile phone, a kiosk, a powerline communication device, a smart appliance (PDA), a server, and/or one or more other electronic systems. For example, a user device may be implemented using a mobile device, such as a mobile phone or a tablet computer. For example, a payment system may be implemented using one or more servers. The electronic device 600 can include a processor unit 602 (possibly including multiple processors, multiple cores, multiple nodes, and/or implementing multi-threading, etc.). The electronic device 600 can also include memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 can also include a bus 610 (e.g., PCI, ISA, PCI-Express, HyperTransport®, InfiniBand®, NuBus, AHB, AXI, etc.), and network interfaces 604 can include wire-based interfaces (e.g., an Ethernet interface, a powerline communication interface, etc.). The electronic device 600 includes a communication interface 608 for network communications. The communication interface 608 can include at least one of a wireless network interface (e.g., a WLAN interface, a Bluetooth interface, a WiMAX interface, a ZigBee interface, a Wireless USB interface, etc.), In some implementations, the electronic device 600 may support multiple network interfaces—each of which is configured to couple the electronic device 600 to a different communication network.

The memory unit 606 can embody functionality to implement embodiments described in FIGS. 1-5 above. In one embodiment, the memory unit 606 can include one or more of functionalities for using proxy transaction services. Any one of these functionalities may be partially (or entirely) implemented in hardware and/or on the processor unit 602. For example, some functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, memory unit 606, the network interfaces 604, and the communication interface 608 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the present disclosure is not limited to them. In general, techniques for using proxy transaction services as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for using integrated transaction proxy services, the method comprising:
    accessing transaction details of a potential transaction for an item or a service at a merchant associated with a first merchant location, the potential transaction initiated by a user at a user device at a first user location;
    determining, based on one or more of merchant characteristics of the merchant or one or more user characteristics associated with the user, whether the potential transaction is associated with a proxy permission that allows use of proxy services;
    initiating, based on the potential transaction being associated with the proxy permission, one or more proxy services for the potential transaction using one or more user locations of the user, wherein each of the one or more user locations is different from the first user location;
    selecting a particular proxy service from the one or more proxy services for initiating a proxy transaction based on the potential transaction using a different user location, said selecting based on comparing one or more selection criteria with results from the one or more proxy services;
    generating, for a checkout interface associated with the potential transaction, a proxy service selection option for the particular proxy service for processing the potential transaction with the merchant, wherein the proxy service selection option comprises an interface button for an executable operation to select the particular proxy service for processing the potential transaction with the merchant via the checkout interface;
    adding the interface button indicating the particular proxy service to the checkout interface with the potential transaction; and
    initiating the proxy transaction in a proxy transaction session of the particular proxy service based on a selection of the interface button, the proxy transaction session using the transaction details of an original session originated by the user, and the proxy transaction is configured to use a payment instrument of the user configured for the original session.

2. The method of claim 1, wherein said initiating of the one or more proxy services comprises initiating the one or more proxy services for the potential transaction further at one or more merchant locations of the merchant, wherein each of the one or more merchant locations is different from the first merchant location, and wherein said selecting the particular proxy service is further based on the potential transaction at a different merchant location from the one or more merchant locations.

3. The method of claim 1, further comprising:
    receiving, from the user device, a transaction request for the potential transaction, wherein the transaction details are based on the transaction request.

4. The method of claim 1, wherein the adding the interface button comprises causing a user interface of a computing device to display the interface button for using the particular proxy service to perform the proxy transaction.

5. The method of claim 1, wherein the selection criteria comprise one or more of a price of the item, a shipping speed for delivery of the item to the user, a cost of the delivery, taxes associated with the potential transaction, or each of respective proxy transactions associated with the one or more proxy services.

6. The method of claim 1, wherein each of the one or more proxy services comprises a respective agent of one or more agents, and wherein each of the one or more agents changes at least one of the transaction details for usage with the one or more proxy services.

7. The method of claim 1, wherein each of the one or more proxy services is configured to anonymize the user at each of the one or more user locations or one or more merchant locations.

8. The method of claim 1, wherein said initiating the one or more proxy services comprises accessing a merchant server using a different set of user characteristics at each of the one or more proxy services, and wherein each of the one or more proxy services is configured to appear unique to the merchant server.

9. The method of claim 1,
    wherein the potential transaction comprises multiple items that include the item; and
    wherein a different proxy service of the one or more proxy services is selected for each of the multiple items.

10. The method of claim 1, wherein the interface button comprises an identification of the particular proxy service in the checkout interface.

11. A system comprising:
    a non-transitory memory storing instructions; and
    a processor configured to execute the instructions to cause the system to:
        determine transaction details of a potential transaction initiated by a user for an item or a service at a merchant associated with a first merchant location, the potential transaction accessed from a user device at a first user location;
        determine that a potential transaction is associated with a proxy permission indicating permission to use proxy services;
        initiate, based on the potential transaction being associated with the proxy permission, one or more proxy services for performing the potential transaction at one or more user locations of the user, each of the one or more user locations being different from the first user location;
        determine, based on one or more selection criteria, a particular proxy service from the one or more proxy services for initiating a proxy transaction based on the potential transaction using a user location that is different from the first user location;
        generate, for a checkout interface associated with the potential transaction, a proxy service selection option for the particular proxy service for processing the potential transaction with the merchant, wherein the proxy service selection option comprises an executable operation to select the particular proxy service for processing the potential transaction with the merchant via the checkout interface;
add an interface button indicating the particular proxy service to the checkout interface with the potential transaction; and
initiate the proxy transaction in a proxy transaction session of the particular proxy service based on a selection of the interface button, the proxy transaction session using the transaction details of an original session originated by the user, and the proxy transaction is configured to use a payment instrument of the user configured for the original session.

12. The system of claim 11, wherein initiating of the one or more proxy services comprises initiating the one or more proxy services for the potential transaction further at one or more merchant locations of the merchant, wherein each of the one or more merchant locations is different from the first merchant location, and wherein said determining the particular proxy service is further based on the potential transaction at a different merchant location from the one or more merchant locations.

13. The system of claim 11, wherein executing the instructions further cause the system to,
receive, from the user device, a transaction request for the potential transaction, wherein the transaction details are determined based on the transaction request.

14. The system of claim 11, wherein each of the one or more proxy services comprises a respective agent of one or more agents, and wherein each of the one or more agents changes at least one of the transaction details for usage with the one or more proxy services.

15. The system of claim 11, wherein said initiating the one or more proxy services comprises accessing a merchant server using a different set of user characteristics at each of the one or more proxy services, and wherein each of the one or more proxy services is configured to appear unique to the merchant server.

16. The system of claim 11, wherein the interface button comprises an identification of the particular proxy service in the checkout interface.

17. A non-transitory machine-readable medium having instructions stored thereon, the instructions executable to cause performance of operations comprising:
accessing transaction details of a potential transaction for an item or a service at a merchant associated with a first merchant location, the potential transaction initiated by a user at a user device at a first user location;
determining, based on one or more of merchant characteristics of the merchant or one or more user characteristics associated with the user, whether the potential transaction is associated with a proxy permission that allows use of proxy services;
determining that a potential transaction is associated with the proxy permission indicating permission to use proxy services;
initiating, based on the potential transaction being associated with the proxy permission, one or more proxy services for performing the potential transaction at one or more user locations of the user, each of the one or more user locations being different from the first user location;
determining, based on one or more selection criteria, a particular proxy service from the one or more proxy services for initiating a proxy transaction based on the potential transaction using a user location that is different from the first user location;
generating, for a checkout interface associated with the potential transaction, a proxy service selection option for the particular proxy service for processing the potential transaction with the merchant, wherein the proxy service selection option comprises a selectable option for the particular proxy service that processes the potential transaction with the merchant via the checkout interface;
displaying, within the checkout interface, the selectable option indicating the particular proxy service with the potential transaction; and
initiating the proxy transaction in a proxy transaction session of the particular proxy service based on a selection of the selectable option, the proxy transaction session using the transaction details of an original session originated by the user, and the proxy transaction is configured to use a payment instrument of the user configured for the original session.

18. The non-transitory machine-readable medium of claim 17, wherein said initiating of the one or more proxy services comprises initiating the one or more proxy services for the potential transaction further at one or more merchant locations of the merchant, wherein each of the one or more merchant locations is different from the first merchant location, and wherein said determining the particular proxy service is further based on the potential transaction at a different merchant location from the one or more merchant locations.

19. The non-transitory machine-readable medium of claim 17, wherein each of the one or more proxy services comprises a respective agent of one or more agents, and wherein each of the one or more agents changes at least one of the transaction details for usage with the one or more proxy services.

20. The non-transitory machine-readable medium of claim 17, wherein said initiating the one or more proxy services comprises accessing a merchant server using a different set of user characteristics at each of the one or more proxy services, and wherein each of the one or more proxy services is configured to appear unique to the merchant server.

* * * * *